United States Patent [19]

Franchetti et al.

[11] Patent Number: 4,613,206

[45] Date of Patent: Sep. 23, 1986

[54] SYSTEM FOR THE FLEXIBLE COMPOSITION OF LASER BEAMS

[75] Inventors: Ilario Franchetti, S. Vittore Olona; Lino Grisoni, Cantu' ; Luciano Garifo; Giovanni Incerti, both of Milan; Vincenzo Fantini, Sesto San Giovanni, all of Italy

[73] Assignees: Alfa Romeo Auto S.p.A, Napoli; CISE-Centro Informazioni Studi Esperienze S.p.A., Milan, both of Italy

[21] Appl. No.: 648,260

[22] Filed: Sep. 7, 1984

[30] Foreign Application Priority Data

Dec. 20, 1983 [IT] Italy ................... 24272 A/83

[51] Int. Cl.⁴ .................................................. G02B 27/10
[52] U.S. Cl. ............................... 350/174; 350/172; 219/121 LS; 219/121 LQ
[58] Field of Search ............... 350/174, 172, 620, 601, 350/319; 219/121 LS, 121 LQ

[56] References Cited

U.S. PATENT DOCUMENTS

| | | |
|---|---|---|
| 1,662,693 | 3/1928 | Astafiev .................. 350/172 |
| 1,812,765 | 6/1931 | Astafiev .................. 350/172 |
| 4,164,366 | 8/1979 | Sziklas et al. ............ 350/620 |
| 4,170,405 | 10/1979 | Sziklas ................... 350/620 |
| 4,190,814 | 2/1980 | Van Workum ............ 350/620 |
| 4,266,854 | 5/1981 | Avicola .................. 350/174 |

FOREIGN PATENT DOCUMENTS 1553582 10/1979 United Kingdom ......... 219/121 LS

Primary Examiner—Jon W. Henry
Attorney, Agent, or Firm—Charles E. Brown; Charles A. Brown

[57] ABSTRACT

This invention provides a system for the flexible composition of laser beams, in which several beams of substantially annular cross-section can be fed to a composition unit which combines them by causing them to propagate one within the other in such a manner that the cross-section of the composite beam is constituted by the cross-sections of the component beams.

11 Claims, 4 Drawing Figures

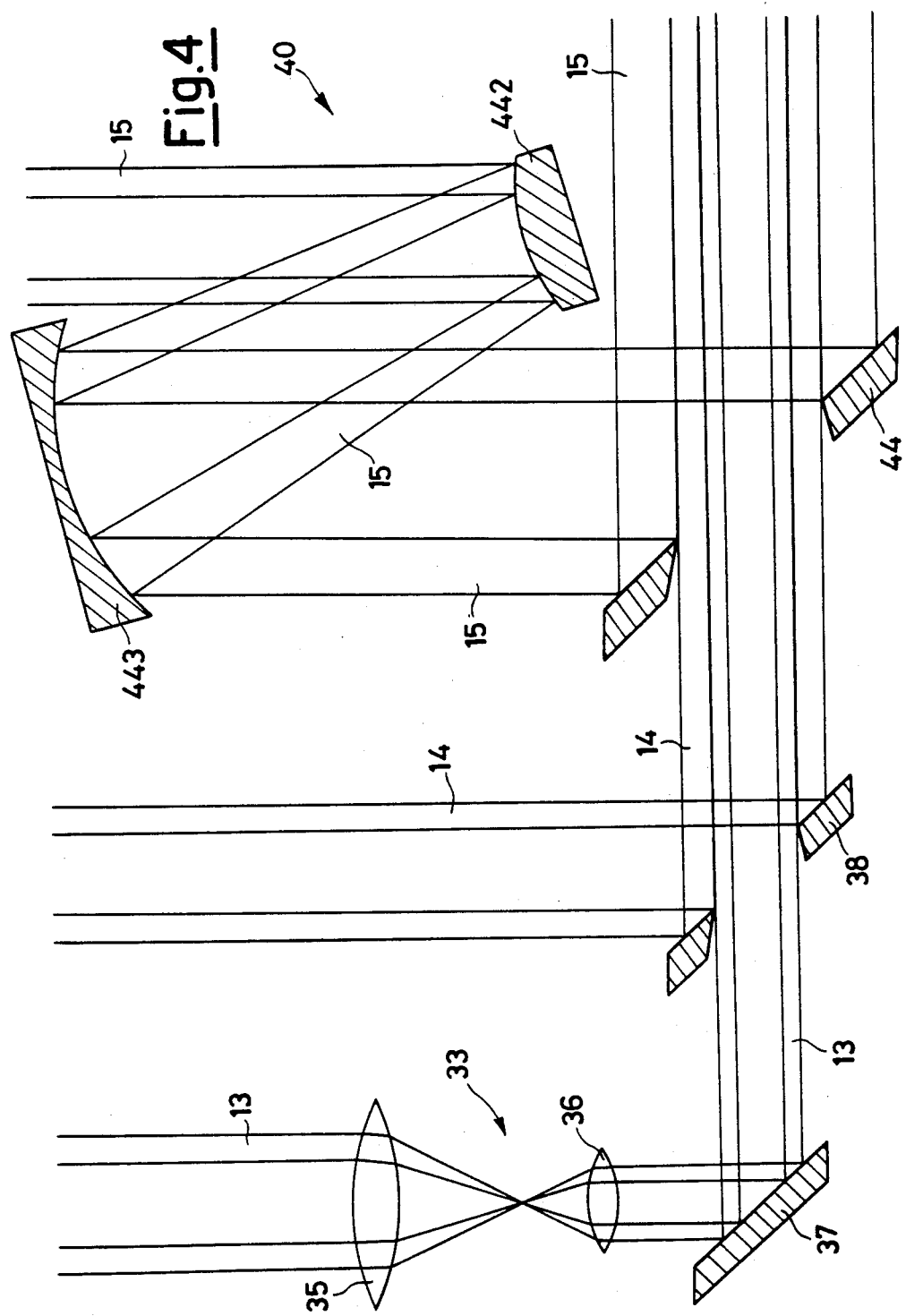

SYSTEM FOR THE FLEXIBLE COMPOSITION OF LASER BEAMS

This invention relates to a system for the flexible composition of power laser beams, which is capable of feeding from the laser sources to each working station either the individual laser beam or a beam obtained by combining individual beams and having a power which is the sum of those of the component beams.

The energy of laser beams is widely used in the technolgoical field, ranging from material heat treatment to mechanical operations such as cutting and welding, and beams with different characteristics and power are required according to the type of application. It may therefore be required to feed various working stations, each of which absorbs a power which varies according to the type of operation and of the piece to be worked (material, dimensions).

The problem can be solved by using a single laser source of adequate power, together with means which enable the relative laser beam to be used either in its entirety or to be divided into several beams of lower power.

However, where the maximum required power is very high, a solution of this kind may not be convenient from the economical viewpoint, because of plant, operating and maintenance costs, or from the reliability aspect, because of the complexity of the system and the total lack of stand-by, should a fault develop in the single laser source.

In contrast, a solution based on the availability of several laser beams originating from different laser sources is more versatile both in operation and from the future expansion aspect, and has a higher degree of reliability because the probability of complete shutdown due to the simultaneous failure of all the laser sources is low.

However, in such a case the problem of obtaining high-power laser beams from several beams of lower power has to be solved. In this respect, it has been proposed to combine several laser beams by means of systems in which the individual beams are propagated side-by-side and are superposed at a common focal point by suitable focusing devices.

However, these solutions do not enable laser beams to be obtained having the focusing characteristics generally required for mechanical operations.

The present invention provides a system for the flexible composition of laser beams which enables the same beams to be used either individually or in combination according to operational requirements, and which has various advantages such as interchangeability of laser sources and maximum facility for varying the power available at each of the working stations.

The system according to the invention comprises at least two laser sources capable of emitting laser beams and working stations, a decoupling unit constituted by suitable pairs of mirrors disposed at prechosen angles of incidence, a composition unit, and directing units constituted by matrices of mobile mirrors disposed at prechosen angles of incidence, said units being operationally connected to each other, to said laser sources and to the working stations, the system being characterised in that at least one of said laser sources is capable of emitting a beam of substantially annular cross-section, and in that the composition unit comprises conveying means capable of feeding a first beam in a determined propagation direction, and at least one holed mirror for reflecting sand beam of substantially annular cross-section, the hole in said mirror having dimensions substantially equal to the outer dimensions of the first beam, said mirror being disposed coaxially to said direction of propagation of said first beam and being disposed inclined to said direction of propagation, downstream of said mirror there being available a composite beam having a cross-section constituted by the concentric cross-sections of the component beams. According to a preferred embodimemt, the composition unit also comprises means for varying the dimensions of the cross-sections of the laser beams, which are able to reduce them or magnify them in order to effect the coaxial combining thereof.

Characteristics and advantages of the invention are described hereinafter with reference to the accompanying FIGS. 1 to 4, which show preferred embodiments of the invention by way of non-limiting example.

FIG. 4 represent a modification of the embodiment of FIG. 2.

Figure 1:
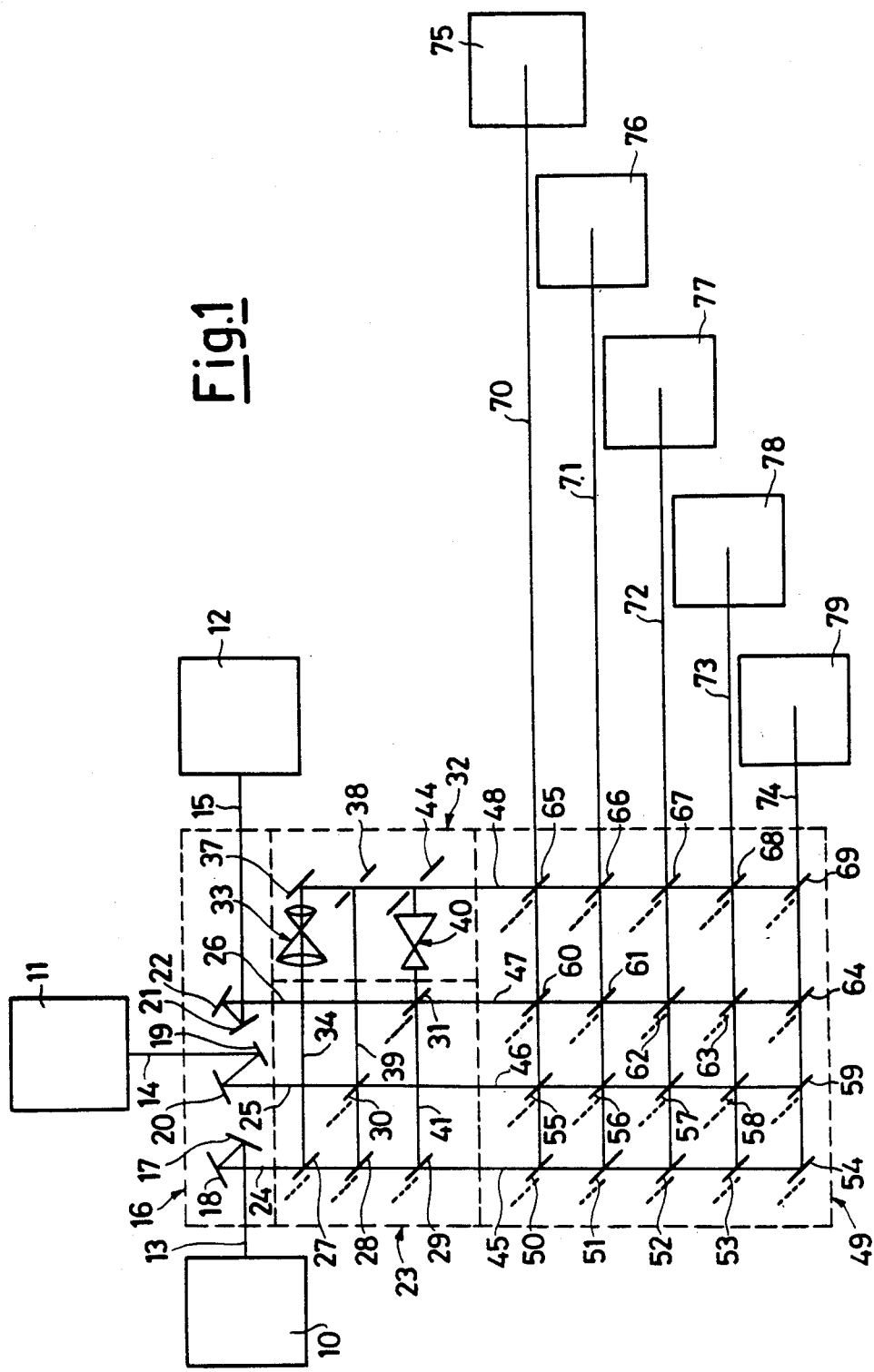
FIG. 1 is a diagrammatic representation of one embodiment of the flexible composition system.

In FIG. 1, the blocks 10, 11, 12 represent three 2.5 kW power laser beam sources of the continuous $CO_2$ type.

The laser sources 10, 11, 12 are disposed at a suitable height from the ground in such a manner that the three laser beams, represented by the lines 13, 14, 15, propagate in the same plane at a predetermined level. In this particular case, the three beams are of annular cross-section.

The reference numeral 16 indicates overall a decoupling unit comprising the pairs of mirrors 17 and 18, 19 and 20, 21 and 22, disposed at a small angle of incidence.

These mirrors, which are flat and of copper construction, can swivel about two orthogonal axes and can translate, so that it is possible to align the beam emitted by a given source with the optical axis of the optical systems disposed downstream.

The reference numeral 23 indicates overall a directing unit comprising three input channels represented by the lines 24, 25, 26, which are disposed in the direction of propagation of the reflected beams leaving the unit 16.

The unit 23 comprises three flat circular mirrors 27, 28, 29, each of which is mobile and can be disposed in an active position at a prechosen angle of incidence, for example 45°.

In the figure the mirrors are shown in their inactive position by dashed lines, and in their active position by full lines with their centre coinciding with the axis of the beam 13 originating from the channel 24.

The unit 23 comprises a further two flat circular mirrors indicated by 30 and 31. These are also mobile and can be aligned, with a prechosen angle of incidence (again 45°), with the input channels 25 and 26, from which the beams 14 and 15 propagate.

Figure 2:
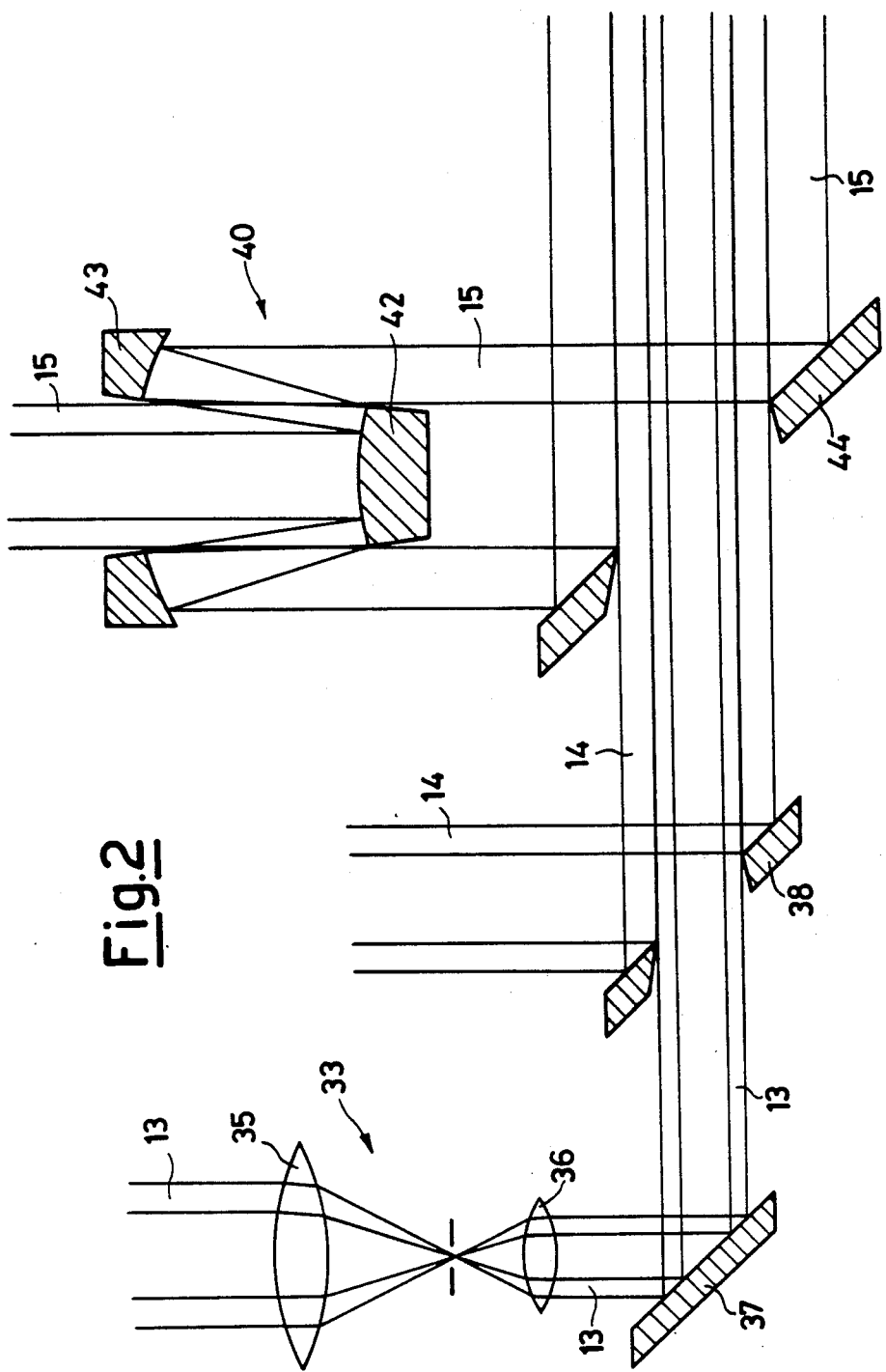
FIG. 2 shows part of the system of FIG. 1 in greater detail.

The reference numeral 32 indicates overall a composition unit, which is shown in greater detail in FIG. 2. The unit 32 comprises a reducer 33 of known type disposed with its optical input axis in the direction, represented by the line 34, in which the beam 13 reflected by the mirror 27 when in its active position is propagated.

The purpose of the reducer 33, which as shown in FIG. 2 is constituted by a collimator lens assembly which has two collimator lenses 35 and 36 with a common focal point, is to reduce the cross-section of the beam 13 with similitude by a prechosen reduction factor.

Downstream of the reducer 33 there is disposed a flat mirror 37, with its centre on the optical axis of said reducer 33. The reference numeral 38 indicates a holed flat mirror disposed coaxially to the mirror 37 and having its centre coinciding with the axis, represented by the line 39, of the beam reflected by the mirror 28 (beam 13) or by the mirror 30 (beam 14).

The inner dimensions of the hole in the mirror 38 are substantially equal to the inner dimensions of the beam reflected by the mirror 28 or by the mirror 30, and also substantially equal to the outer dimensions of the beam reflected by the mirror 37.

The unit 32 also comprises an expander 40 of known type, with its optical axis disposed in the direction, represented by the line 41, in which either the beam 13 reflected by the mirror 29 when in its active position or the beam 15 reflected by the mirror 31 is propagated.

The expander 40 is constituted by two mirrors, namely a convex mirror 42 of spherical cap shape and a concave mirror 43 in the form of a spherical segment, as shown in FIG. 2. The purpose of the expander is to magnify with similitude the cross-section either of the beam 13 reflected by the mirror 29 or of the beam 15 reflected by the mirror 31 by a prechosen expansion factor.

Alternatively, the expander 40 could have its optical axis inclined to the axis of the beam 15 by a predetermined angle. In this case, as shown in FIG. 4, the expander can be constituted by two mirrors, namely a convex mirror 442 and a concave mirror 443, both of spherical cap shape. The two mirrors have their axes parallel, and the optical axis of the mirror 442 is inclined to the axis of the beam 15.

Downstream of the expander 40 there is disposed a flat holed mirror 44 which is coaxial to the mirrors 37 and 38, and has its centre coinciding with the optical axis of the expander 40.

The inner diameter of the mirror 42 is substantially equal to the inner diameter of the beam reflected by the expander 40 and also substantially equal to the outer diameter of the beam reflected by the mirror 38.

The units 23 and 32 comprise four output channels 45, 46, 47, 48. Of these, the first three are coaxial to the input channels 24, 25, 26 respectively, their purpose being to emit the individual laser beams (either 13, or 14, or 15). The fourth is coaxial to the mirrors 37, 38, 44, its purpose being to emit a beam which is the sum of two (13+15, or 14+15, or 13+14) or of three (13+14+15) individual beams.

In FIG. 1, the reference numeral 49 indicates a directing unit in the form of a matrix of mobile mirrors equal in number to the product of the number of output channels of the units 23 and 32 and the number of working stations.

In this particular case there are five working stations, and thus the unit 49 comprises four columns of five mobile flat mirrors 50-54, 55-59, 60-64, and 65-69. Each mirror of each column can be moved from its inactive position (shown by a dashed line) to its active position (shown by a full line), in which it is disposed concentric with an output channel of the units 23 and 32 and coaxial to one of the output channels 70-74 of the unit 49.

The working stations, which are represented by the blocks 75, 76, 77, 78, 79, are provided for carrying out various mechanical operations, such as welding and heat treatment.

The three laser beams 13, 14, 15 emitted by the laser sources 10, 11, 12 can be fed individually to any three of the five working stations, and in this case all the mirrors of the directing unit 23 are in their inactive positions, whereas in the directing unit 49 three mirrors are in their active position, namely those disposed at the intersections of the columns aligned with the channels 45, 46, 47 and the lines aligned with three of the output channels 70, 71, 72, 73, 74.

A beam obtained from the summation of all three laser beams 13, 14, 15 or of two of them can also be fed to the working stations. In the first case, the mirrors 24, 30, 31 are disposed in their active position in the unit 23, and the three laser beams 13, 14, 15 are reflected towards the composition unit 32.

On passing through the lenses 35 and 36 of the reducer 33, the beam 13 undergoes a cross-section contraction with similitude, as shown in FIG. 2, and in this reduced state is reflected by the mirror 37 in the direction of the output channel 48. The beam 14 strikes the holed mirror 38 and is reflected coaxially to the beam 13 in the direction of the output channel 48. The beam 15 passes through the expander 40, striking the convex mirror 42, from which it is reflected, magnified with similitude, towards the concave mirror 43. From this latter it is reflected towards the holed flat mirror 44, which itself reflects it coaxially to the beams 13 and 14 in the direction of the output channel 48.

Thus in this channel there is available a composite beam with its cross-section constituted by the concentric sections of the component beams.

This composite beam is directed towards any one of the working stations by means of a mirror of the unit 49 disposed in its active position at the intersection of the column aligned with the channel 48 and the line aligned with an output channel between 70 and 74, which is connected in its turn to the working station concerned. A beam which is the sum of only two beams can be obtained by an analogous procedure. In this case, only two of the three beams are reflected towards the composition unit 32.

A system formed in this manner is extremely flexible because either any one of the three laser beams emitted by the laser sources, or a beam which is the sum of two or of three of the available beams can be fed to any one of the five working stations.

A further advantage of the system is that it can be constructed from commercially available components, without requiring special components.

Figure 3:
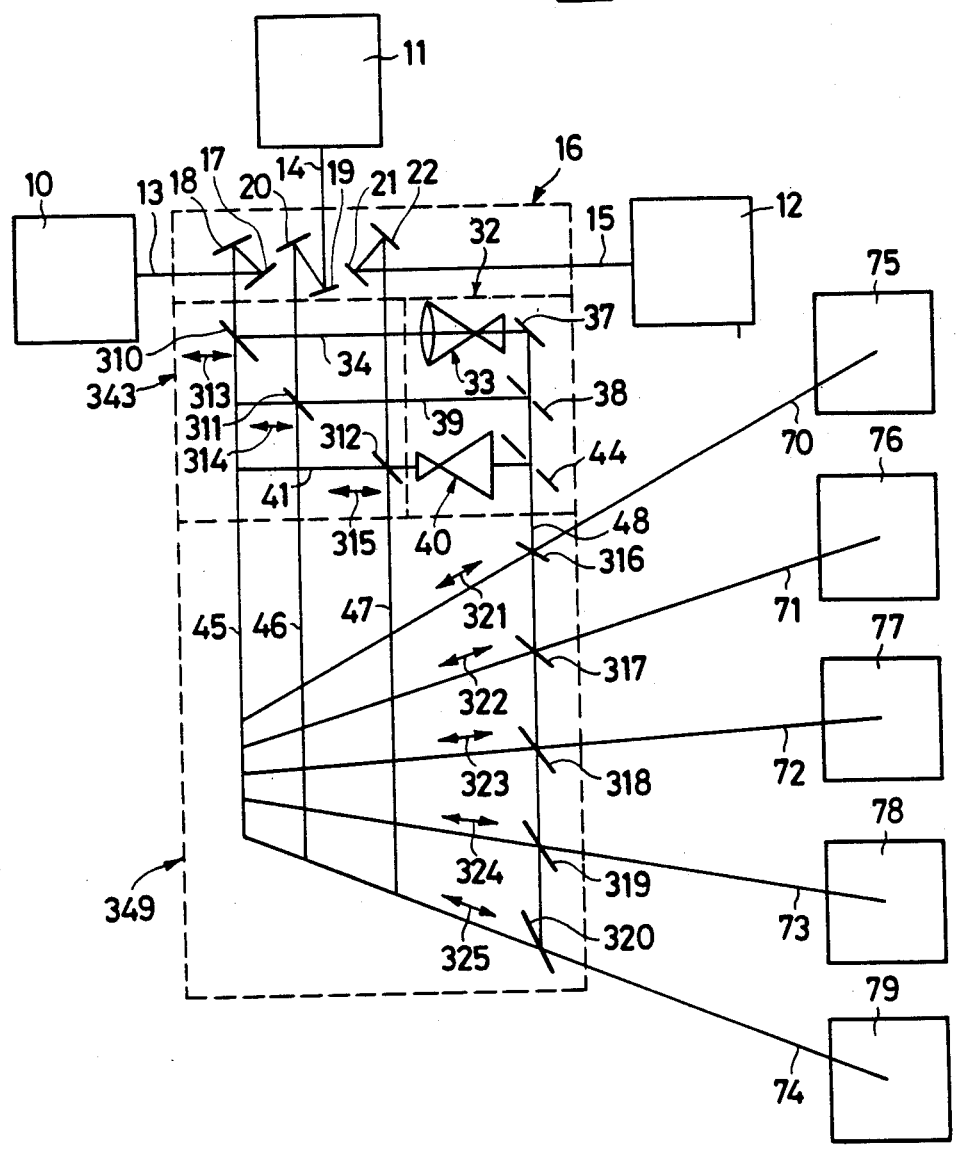
FIG. 3 represents a modification of the system of FIG. 1.

FIG. 3 shows a modification of the system of FIG. 1. Some parts are unchanged and are indicated by the same reference numerals, whereas the directing units 23 and 49 have been modified and are now indicated by the reference numerals 323 and 349.

The unit 323 comprises three mobile mirrors indicated by 310, 311, 312, which are able to undergo translatory motion in the direction of the arrows 313, 314, 315. These mirrors can thus assume different active positions in addition to their inactive positions.

The unit 349 comprises five mobile mirrors 316, 317, 318, 319, 320 able to undergo translatory motion in the direction of the arrows 321, 322, 323, 324, 325, i.e. in directions inclined to the direction of propagation of the beams which can enter from the channels 45, 46, 47, 48, by an angle, which can be other than 90°.

Again in this case, by being made to translate, the mirrors can assume different active positions in addition to their inactive positions.

Compared with the embodiment of FIG. 1, this embodiment has the advantage of using a substantially smaller number of optical elements, and of allowing a different location of the working stations.

We claim:

1. A system for the flexible composition of laser beams, comprising at least two laser sources for emitting laser beams and working stations, a decoupling unit constituted by suitable pairs of mirrors disposed at prechosen angles of incidence, a composition unit, and directing units constituted by matrices of mobile mirrors disposed at prechosen angles of incidence, said units being operationally connected to each other, to said laser sources and to the working stations, the system being characterised in that at least one of said laser sources emits a beam of substantally annular cross-section, and in that the composition unit comprises conveying means for feeding a first beam in a determined direction of propagation, and at least one holed mirror for reflecting said beam of substantially annular cross-section, the hole in said mirror having dimensions substantially equal to the outer dimensions of the first beam, said mirror being disposed coaxially to said direction of propagation of said first beam and being inclined to said direction of propagation by a prechosen angle, downstream of said mirror there being available a composite beam having a cross-section constituted by the concentric cross-sections of the component beams.

2. A system as claimed in claim 1, characterised in that said composition unit also comprises variation means for varying the dimensions of the cross-section of at least one of said laser beams.

3. A system as claimed in claim 2, characterised in that said variation means are constituted by a reducer having its optical axis aligned with the axis of said first laser beam.

4. A system as claimed in claim 3, characterised in that said reducer is constituted by a collimator lens assembly having two collimator lenses.

5. A system as claimed in claim 2, characterised in that said variation means are constituted by an expander having its optical axis aligned with the axis of said beam of substantially annular cross-section.

6. A system as claimed in claim 5, characterised in that said expander is constituted by two mirrors, namely a convex mirror of spherical cap shape and a concave mirror of spherical segment shape.

7. A system as claimed in claim 2, characterised in that said variation means are constituted by an expander having the optical axis of its inlet element inclined by a prechosen angle to the axis of said beam of substantially annular cross-section.

8. A system as claimed in claim 7, characterised in that said expander is constituted by two mirrors, namely a convex and a concave, both of sperical cap shape, which are disposed with their axes parallel and with the optical axis of the convex mirror inclined by a predetermined angle to the axis of the input beam.

9. A system as claimed in claim 1, charaacterised in that said composition unit also comprises an expander having its optical axis aligned with the axis of a further beam of substantially annular crosss-section, and a further holed mirror for reflecting said further beam, said mirror, which is disposed downstream of said expander, having the inner dimensions of its hole equal to the outer dimensions of said second beam and being disposed coaxial to said direction of propagation of the first beam and inclined by a prechosen angle to said direction of propagation.

10. A system as claimed in claim 1, characterised in that said composition unit also comprises an expander having the optical axis of its inlet element inclined by a predetermined angle to the axis of a further beam of substantially annular cross-section, and a further holed mirror for reflecting said further beam, said mirror, which is disposed downstrean of said expander, having the inner dimensions of its hole equal to the outer dimensions of said second beam and being disposed coaxial to said direction of propagation of the first beam and inclined by a prechosen angle to said direction of propagation.

11. A system as claimed in claim 1, characterised in that said conveying means are constituted by a flat mirror having its axis disposed in said direction of propagation.

* * * * *